United States Patent
Mishra et al.

(10) Patent No.: US 12,038,954 B2
(45) Date of Patent: Jul. 16, 2024

(54) QUERY CORRECTION BASED ON REATTEMPTS LEARNING

(71) Applicant: Rovi Guides, Inc., San Jose, CA (US)

(72) Inventors: Ajay Kumar Mishra, Karnataka (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 537 days.

(21) Appl. No.: 17/218,963

(22) Filed: Mar. 31, 2021

(65) Prior Publication Data

US 2022/0318283 A1    Oct. 6, 2022

(51) Int. Cl.
G06F 16/00 (2019.01)
G06F 16/31 (2019.01)
G06F 16/33 (2019.01)
G06F 16/332 (2019.01)
G06N 20/00 (2019.01)

(52) U.S. Cl.
CPC .......... *G06F 16/3322* (2019.01); *G06F 16/31* (2019.01); *G06F 16/3329* (2019.01); *G06F 16/3349* (2019.01); *G06N 20/00* (2019.01)

(58) Field of Classification Search
CPC .. G06F 16/31; G06F 16/3322; G06F 16/3329; G06F 16/3349
USPC ........................................................ 707/767
See application file for complete search history.

(56) References Cited

U.S. PATENT DOCUMENTS

| | | | | |
|---|---|---|---|---|
| 6,144,958 A * | 11/2000 | Ortega | ................. | G06F 40/232 707/999.005 |
| 6,418,432 B1 * | 7/2002 | Cohen | ................. | G06F 16/9538 707/999.005 |
| 6,976,019 B2 * | 12/2005 | Davallou | ................ | G06F 16/30 704/238 |
| 7,231,375 B2 * | 6/2007 | Ratnaparkhi | ....... | G06F 16/3329 706/14 |
| 7,752,201 B2 * | 7/2010 | Anderson | ............. | G06F 16/951 707/731 |
| 8,688,667 B1 * | 4/2014 | Kurzion | .............. | G06F 16/9535 706/20 |

(Continued)

OTHER PUBLICATIONS

Le et al., "Distributed Representations of Sentences and Documents," In Proceedings of the 31st International Conference on Machine Learning, PMLR 32(2):1188-1196, 2014.

(Continued)

*Primary Examiner* — Mariela Reyes
*Assistant Examiner* — Rezwanul Mahmood
(74) *Attorney, Agent, or Firm* — Haley Guiliano LLP

(57) ABSTRACT

Systems and methods are described to access a set of reattempt query pairs, where each respective pair comprises an initial query and a reattempt of the initial query, and is associated with an indication of whether a reply generated for output based on the respective query pair was acceptable. In response to determining that a second query received after a first query constitutes a reattempt of the first query, a query pair in the set of reattempt query pairs may be identified that matches at least one of the first query and the second query, and is associated with an indication that a reply generated for output based on the query pair was acceptable. A search may be performed based on the identified query pair in the set of reattempt query pairs, and a reply may be generated for output based on the performed search.

20 Claims, 10 Drawing Sheets

(56) References Cited

U.S. PATENT DOCUMENTS

| | | | | |
|---|---|---|---|---|
| 9,183,257 | B1* | 11/2015 | Buchanan | G06F 16/2455 |
| 9,424,342 | B1* | 8/2016 | Ravichandran | G06F 16/9537 |
| 9,727,906 | B1* | 8/2017 | Sarmento | G06Q 30/0631 |
| 10,404,733 | B1* | 9/2019 | Shavell | H04L 63/1433 |
| 10,762,083 | B2* | 9/2020 | Firooz | G06F 16/313 |
| 10,810,193 | B1* | 10/2020 | Subramanya | G06F 16/245 |
| 10,860,450 | B1* | 12/2020 | Dageville | G06F 16/2465 |
| 11,386,105 | B2* | 7/2022 | Fourney | G06F 16/2425 |
| 11,526,512 | B1* | 12/2022 | Halabi | G06F 40/289 |
| 11,531,671 | B2* | 12/2022 | Shmueli | G06N 5/04 |
| 11,574,020 | B1* | 2/2023 | Zhai | G06F 16/84 |
| 11,657,030 | B2* | 5/2023 | Cao | G06F 16/285 707/740 |
| 11,663,278 | B2* | 5/2023 | Xue | G06F 40/30 707/706 |
| 11,675,795 | B2* | 6/2023 | Yin | G06F 16/24578 707/730 |
| 2008/0114721 | A1* | 5/2008 | Jones | G06F 16/3338 |
| 2008/0281808 | A1* | 11/2008 | Anderson | G06F 16/951 707/999.005 |
| 2009/0187515 | A1* | 7/2009 | Andrew | G06F 16/9535 707/E17.014 |
| 2009/0248665 | A1* | 10/2009 | Garg | G06F 16/90324 707/999.005 |
| 2009/0300493 | A1* | 12/2009 | Hamilton, II | G06Q 10/10 715/706 |
| 2013/0124492 | A1* | 5/2013 | Gao | G06F 40/232 707/706 |
| 2013/0185306 | A1* | 7/2013 | Botros | G06F 16/2457 707/E17.084 |
| 2014/0337989 | A1* | 11/2014 | Orsini | H04L 51/212 726/26 |
| 2015/0193447 | A1* | 7/2015 | Voinea | G06F 16/3322 707/767 |
| 2016/0012124 | A1* | 1/2016 | Ruvini | G06Q 30/0201 707/760 |
| 2017/0011136 | A1* | 1/2017 | Gabbai | G06Q 30/0641 |
| 2017/0017636 | A1* | 1/2017 | Hasan | G06F 40/232 |
| 2017/0161373 | A1* | 6/2017 | Goyal | G06F 16/31 |
| 2017/0337199 | A1* | 11/2017 | Kogan | G06F 40/169 |
| 2017/0337326 | A1* | 11/2017 | Zhang | G16B 40/00 |
| 2018/0121552 | A1* | 5/2018 | Bostick | G06F 21/6254 |
| 2018/0247247 | A1* | 8/2018 | Xu | G06Q 10/06393 |
| 2019/0140997 | A1* | 5/2019 | Lewin-Eytan | H04L 51/42 |
| 2019/0164071 | A1* | 5/2019 | Paugh | G06N 5/046 |
| 2019/0179940 | A1* | 6/2019 | Ross | G06F 16/24535 |
| 2019/0244484 | A1* | 8/2019 | Nelson | G06F 16/90335 |
| 2019/0286749 | A1* | 9/2019 | Mukherjee | G06F 16/9538 |
| 2019/0370393 | A1* | 12/2019 | Finch | G06F 16/3338 |
| 2020/0004813 | A1* | 1/2020 | Galitsky | G06F 40/30 |
| 2020/0057762 | A1* | 2/2020 | Okajima | G06N 5/022 |
| 2020/0202849 | A1* | 6/2020 | Cartwright | G10L 15/1815 |
| 2020/0294071 | A1* | 9/2020 | Christensen | G06F 16/24578 |
| 2021/0056150 | A1* | 2/2021 | Karandish | G06F 16/3329 |
| 2021/0064503 | A1* | 3/2021 | Dageville | G06F 11/3082 |
| 2021/0191986 | A1* | 6/2021 | Okajima | G06F 40/221 |
| 2021/0326742 | A1* | 10/2021 | Rosset | G06N 5/04 |
| 2021/0374130 | A1* | 12/2021 | Lavi | G06N 5/04 |
| 2021/0397610 | A1* | 12/2021 | Singh | G06N 7/01 |
| 2022/0028373 | A1* | 1/2022 | Li | G10L 15/063 |
| 2022/0086118 | A1* | 3/2022 | Jain | H04W 4/12 |
| 2022/0091669 | A1* | 3/2022 | Krishna | G06N 5/01 |
| 2022/0108143 | A1* | 4/2022 | Volkerink | H04W 4/50 |
| 2022/0155441 | A1* | 5/2022 | Sunegård | G01S 17/46 |
| 2022/0207584 | A1* | 6/2022 | Nakazawa | G06N 3/08 |
| 2022/0245706 | A1* | 8/2022 | Chaidaroon | G06F 16/9535 |
| 2022/0300560 | A1* | 9/2022 | Filice | G06F 16/90335 |
| 2022/0318283 | A1* | 10/2022 | Mishra | G06N 20/00 |
| 2022/0358166 | A1* | 11/2022 | Hubauer | G06F 16/953 |
| 2022/0374434 | A1* | 11/2022 | Nash | G06F 16/9024 |
| 2022/0382818 | A1* | 12/2022 | Chen | H04L 67/535 |
| 2022/0391428 | A1* | 12/2022 | Faruqui | G06N 3/044 |
| 2023/0004601 | A1* | 1/2023 | Rajan | G06F 16/90335 |
| 2023/0074298 | A1* | 3/2023 | Rome | G06F 16/24578 |
| 2023/0130267 | A1* | 4/2023 | Mukherjee | G06F 16/2448 707/760 |
| 2023/0409976 | A1* | 12/2023 | Kimura | G06N 20/00 |
| 2024/0048518 | A1* | 2/2024 | Jain | H04L 51/234 |

OTHER PUBLICATIONS

Mikolov et al., Efficient Estimation of Word Representations in Vector Space, ICLR Workshop, 2013.

U.S. Appl. No. 16/397,004, filed Apr. 29, 2019.

* cited by examiner

QUERY CORRECTION BASED ON REATTEMPTS LEARNING

BACKGROUND

This disclosure is directed to performing processing based on determining that a second query received after a first query constitutes a reattempt of the first query. Specifically, techniques are disclosed for identifying a query pair in a set of reattempt query pairs that is similar to at least one of the first query and the second query and performing a search based on the identified query pair.

SUMMARY

Many users have become accustomed to using search tools (e.g., navigation tools, voice-based queries, text-based queries, etc.) to locate desirable media content. Such tools allow users to search through the enormous amount of content available to users (e.g., a media asset catalog of a content provider, content searchable via a search engine, or other application). However, at times it may be difficult for a user to locate desirable content, such as if the query contains a typographical error, or if the query is not phrased properly, or when voice input is interpreted incorrectly by a voice-controlled system. In one approach, a system may output a suggestion to the user in the event of detecting a possible typographical error (e.g., if a query of "Meat the Parents" is received, the system may output a suggestion to change the query to "Meet the Parents").

However, such approach of analyzing each query individually does not take into account whether at least one other similar query is received during the user's session. For example, there may be a circumstance in which the user enters a series of queries, each related to the same topic, within a short time period (e.g., when the user is not satisfied with the search results returned based on the initial query). Such process of entering repeated queries may be frustrating and time-consuming for a user, and the user may even give up on his or her search if the user is unable to find suitable results returned based on the sequence of queries.

In another approach, the system may automatically correct a user's query and perform a search based on the corrected query, rather than suggesting an alternative query for user selection. However, this approach, particularly when implemented in the case of a voice-based system, has a drawback of overcorrecting a user's query. For example, a user may input via voice the query "Eye pad" into the system with the intent of finding search results related to a cloth dressing for his or her eye, but the system may persistently correct the query to "iPad" under the assumption the user intended to search for an electronic device by that name. Such persistent overcorrection may be frustrating for a user and may even render it impossible for the user to obtain the desired results via voice input for a particular query.

To overcome these problems, systems and methods are provided herein for accessing a set of reattempt query pairs, wherein each respective pair in the set comprises an initial query and a reattempt of the initial query and is associated with an indication of whether a reply generated for output based on the respective query pair was acceptable; determining whether a second query that was received after a first query constitutes a reattempt of the first query; in response to determining that the second query constitutes a reattempt of the first query: identifying a query pair in the set of reattempt query pairs that: (a) matches at least one of the first query and the second query; and (b) is associated with an indication that a reply generated for output based on the query pair was acceptable; performing a search based on the identified query pair in the set of reattempt query pairs; generating for output a reply based on the performed search. In some embodiments, the system may generate such set of reattempt query pairs based on query sequences input by other users.

Such aspects aid a user having entered multiple queries in locating desirable content by, after determining that a query received from the user is a reattempt of an earlier-received query, performing a search based on a similar query pair that previously yielded desirable results (e.g., for another user in a previous session). Thus, the search process for the user may be streamlined to enable the user to avoid the frustrating situation of having to enter a sequence of similar queries before accessing desirable results (or potentially ending the user's session before receiving desirable results). In addition, to address the problem of constantly overcorrecting certain queries and automatically performing searches search based on such corrected query, the system may wait until a reattempt is received before taking remedial action with respect to a query of the query pair, e.g., as an extra layer of confirmation of what the user likely intends by his or her sequence of queries.

In some embodiments, performing the search based on the identified query pair in the set of reattempt query pairs may comprise modifying the second query based on at least one query of the identified query pair, and performing the search using the modified query.

In some aspects of this disclosure, identifying the query pair in the set of reattempt query pairs may comprise comparing the first query and the second query to each query of the query pairs, and determining at least one of the first query and the second query is an exact match of a query of the query pair.

In some embodiments, the set of reattempt query pairs may comprise a first query pair that is associated with a second query pair and a third query pair, and identifying the query pair in the set of reattempt query pairs may comprise: determining the first query matches a query from one of the first query pair or the second query pair; determining the second query matches a query from the other of the first query pair or the second query pair; determining the third query pair comprises a query from one of the first query pair or the second query pair and is associated with an indication that a reply generated for output based on the third query pair was acceptable; and modifying the second query based on the third query pair.

In some aspects of this disclosure, the reply generated for output based on the performed search comprises a selectable identifier for a content item. The above-mentioned systems or methods may, in response to receiving user selection of the identifier, cause the content item to be generated for consumption by a user, where the indication that the reply generated for output based on the query pair was acceptable is generated based on determining the content was consumed by the user.

In some embodiments, determining whether the second query constitutes a reattempt of the first query may comprise determining that content was not consumed based on the first query prior to receiving the second query. The set of reattempt query pairs may be received from a plurality of users within a predetermined period of time from a current time, and such plurality of users may belong to at least one of a particular demographic or geographic area. The set of reattempt query pairs may be discarded after the predetermined period of time elapses.

In some aspects of this disclosure, a reattempt machine learning model may be employed to determine whether the second query constitutes a reattempt of the first query. The reattempt machine learning may be trained to accept as input a third query and a fourth query, and one or more characteristics of the third query and the fourth query, and output a probability that the fourth query is indicative of a reattempt of the third query. An output of the reattempt machine learning model when the first query and the second query, and one or more characteristics of the first query and the second query, are input into the reattempt machine learning model may be used to determine whether the second query constitutes a reattempt of the first query.

Such one or more characteristics (e.g., of the first query pair and the second query pair) may comprise at least one of phonetic word match information as between the queries of the query pair, frequencies of terms within the query pair, common terms or phrases as between the queries of the query pair, parts of speech of terms in the query pair, and whether a previous pair of queries within a query sequence including the query pair constituted a reattempted query.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
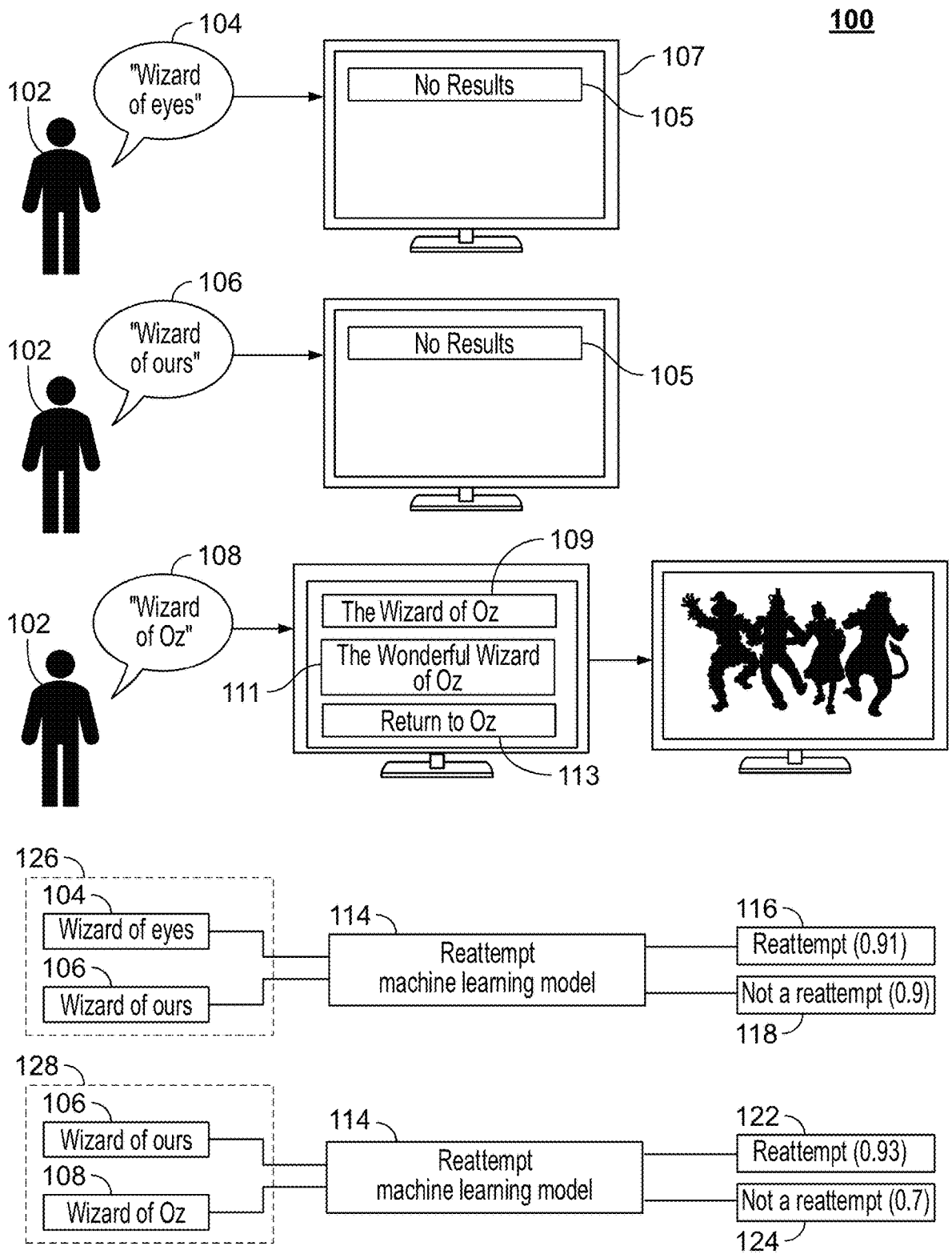
FIG. 1 shows a block diagram for performing a search based on an identified query pair in a set of reattempt query pairs, in accordance with some embodiments of this disclosure.
Figure 1:
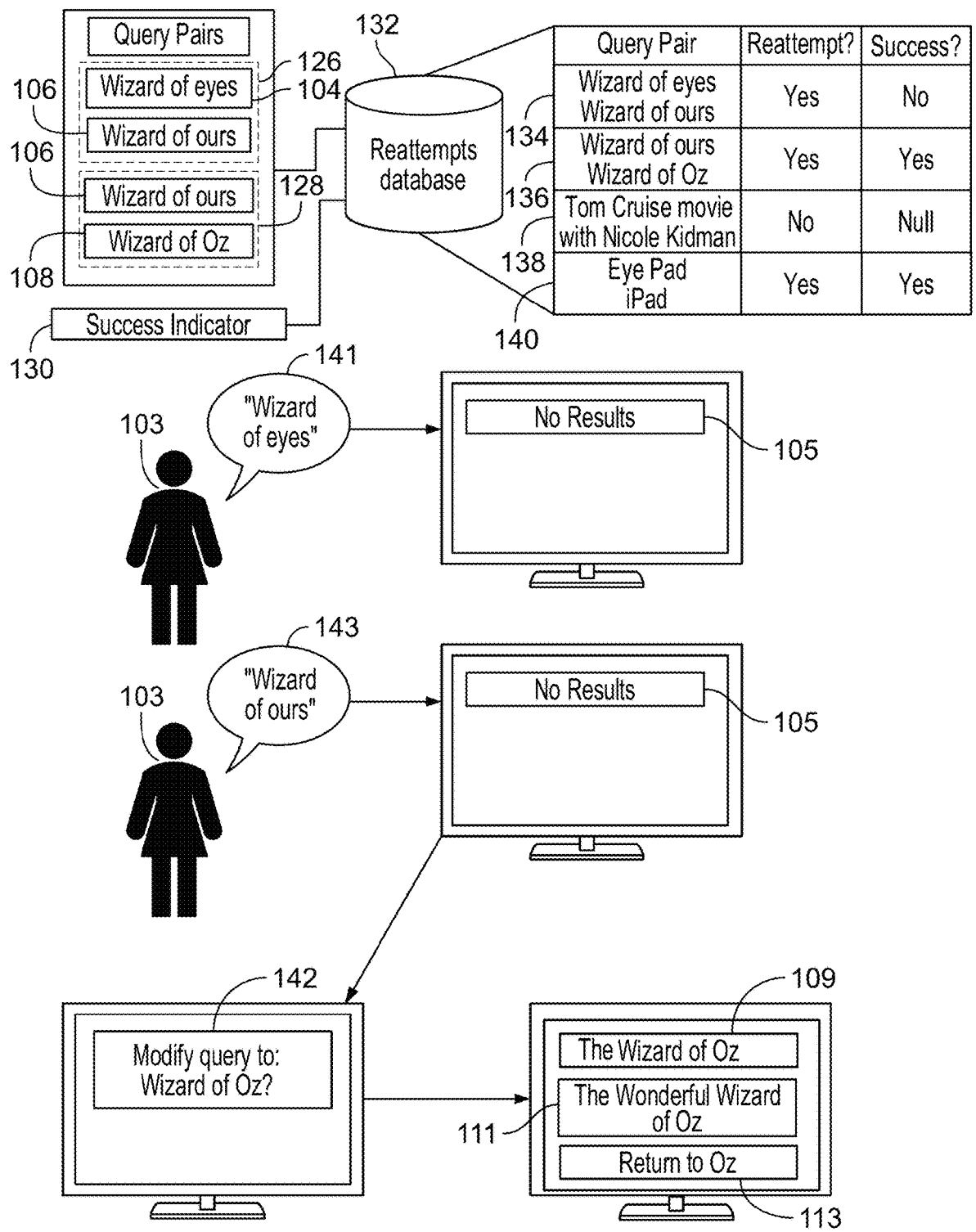

FIG. 1 shows a block diagram 100 for performing a search based on an identified query pair in a set of reattempt query pairs, in accordance with some embodiments of this disclosure. A media application (e.g., executed at least in part on user equipment 107) receives query 104 (e.g., "Wizard of Eyes") from user 102. The media application may be any of a variety of applications (e.g., a search engine, an application providing a user with access to media assets, a website, an application enabling a user to search a database). As referred to herein, the term "media asset" should be understood to refer to an asset that is electronically consumable by a user, e.g., television programming, as well as pay-per-view programs, on-demand programs (as in video-on-demand (VOD) systems), Internet content (e.g., streaming content, downloadable content, webcasts, etc.), video clips, audio, playlists, websites, articles, electronic books, blogs, social media, applications, games, and/or any other media or multimedia, and/or combination of the above.

Figure 4:
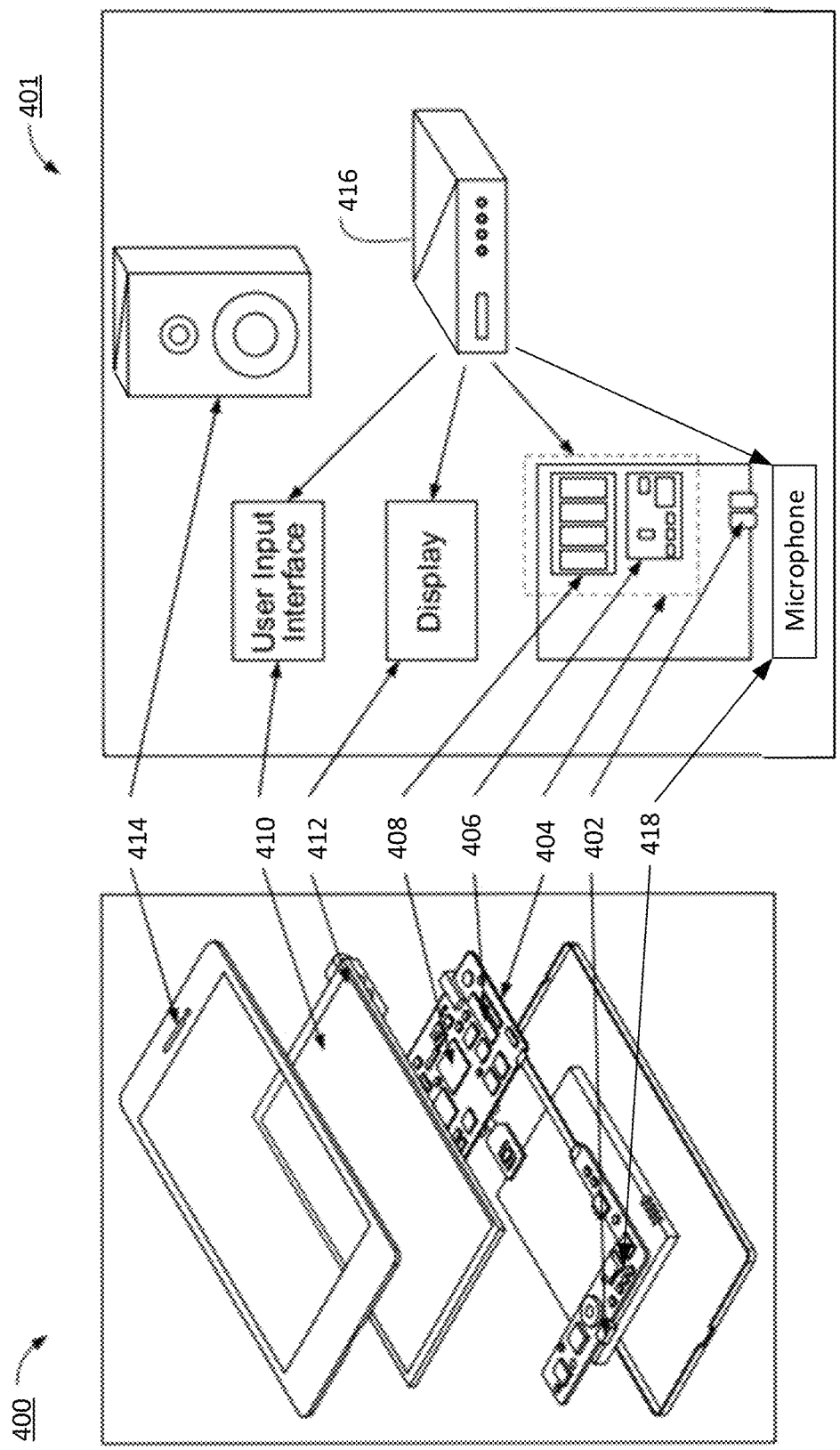
FIG. 4 shows a block diagram of an illustrative media device, in accordance with some embodiments of this disclosure.

The media application may receive query 104 in any suitable format (e.g., text-based input, audio or voice input, touch input, biometric input, or any combination thereof) via a suitable interface (e.g., input interface 410, microphone 418 of FIG. 4, etc.). The media application may (e.g., in a case that query 104 is received in the form of voice or audio) transcribe the input into a string of text using any suitable automatic speech recognition technique, or transcription of the audio signal may be achieved by external transcription services (e.g., Amazon Transcribe by Amazon, Inc. of Seattle, Wash. and Google Speech-to-Text by Google, Inc. of Mountain View, Calif.). The transcription of audio is discussed in more detail in U.S. patent application Ser. No. 16/397,004, filed Apr. 29, 2019, which is hereby incorporated by reference herein in its entirety. In a case that query 104 is received in the form of text or other user selection, the media application may not perform transcription of the query.

Various automated speech recognition (ASR) techniques, e.g., machine learning models, may be employed to interpret received query 104, e.g., recurrent neural networks, bidirectional recurrent neural networks, LSTM-RNN models, encoder-decoder models, transformers, conditional random fields (CRF) models, etc. Such one or more models may be trained to take as input labeled audio files or utterances, and output one or more candidate transcriptions of the audio file or utterance. In some embodiments, the media application may pre-process the received audio input for input into the neural network, e.g., to filter out background noise and/or normalize the signal, or such processing may be performed by the neural network.

In some embodiments, in generating the candidate transcriptions, the automatic speech recognition system may analyze the received audio signal to identity phonemes (i.e., distinguishing units of sound within a term) within the signal, and utilize statistical probability techniques to determine most likely next phonemes in the received query. For example, the neural network may be trained on a large vocabulary of words, to enable the model to recognize common language patterns and aid in the ability to identify candidate transcriptions of query 104. In some embodiments, a prediction of each term of a query may be associated with a confidence level. For example, if a certain term has not yet been learned by the neural network, a lower confidence value may be assigned to such prediction as compared to when the such term has been learned by the neural network.

Once the media application obtains the one or more transcriptions based on ASR techniques, the media application may utilize natural language processing (NLP) techniques to tag the transcription with one or more entities or intents, to facilitate performing a search with the transcribed query. For example, the media application may perform NLP on the terms included in query pair 302 (FIG.

3), e.g., rule-based NLP techniques or algorithms may be employed to parse text included in query 104. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, conjunction, participle, article); perform named entity recognition; and identify phrases, sentences, proper nouns, or other linguistic features of the text string.

Figure 5:
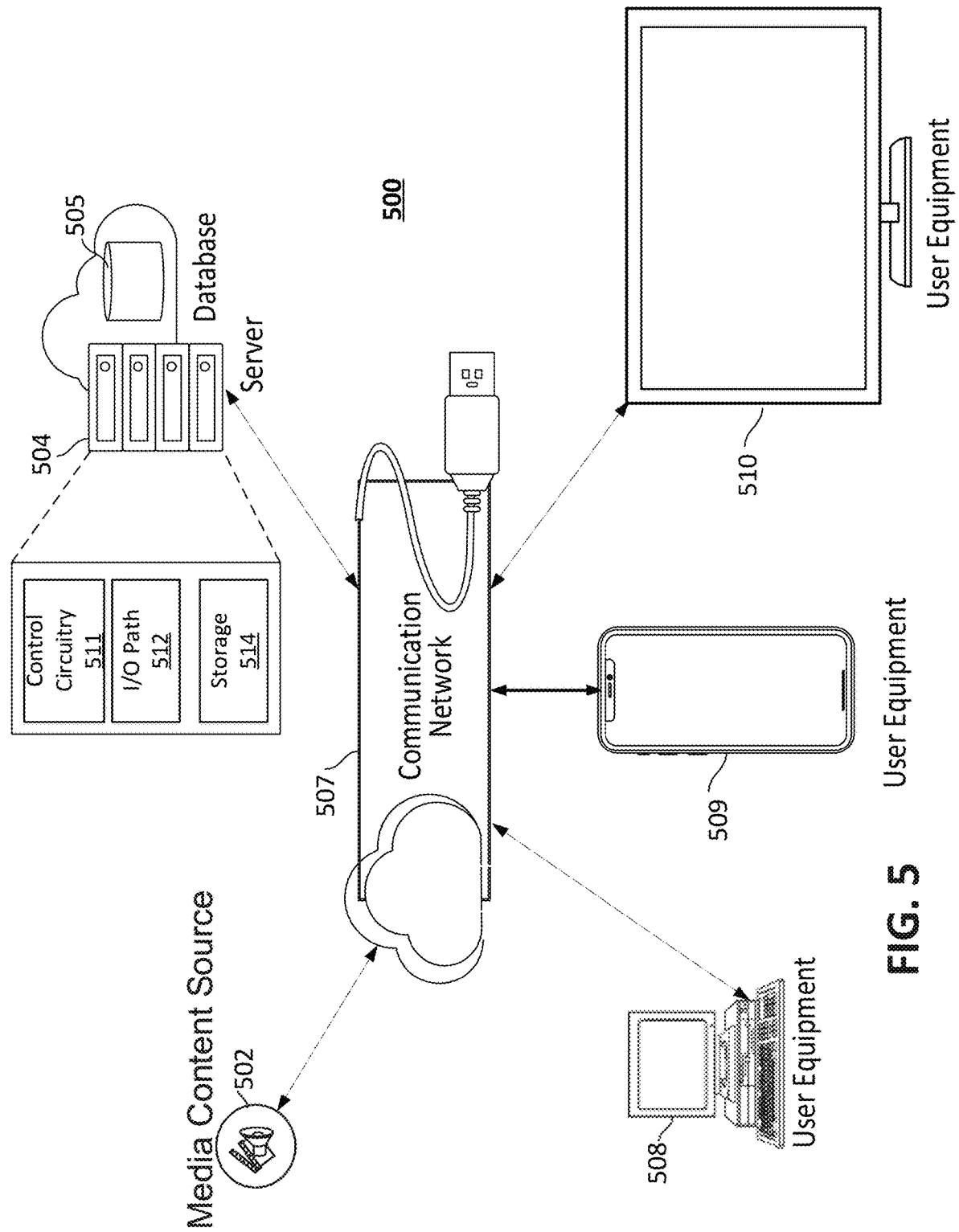
FIG. 5 shows a block diagram of an illustrative media system, in accordance with some embodiments of this disclosure.

In response to receiving query 104, the media application may determine whether one or more results match query 104 (e.g., by querying one or more of media content source 502, server 504, database 505 of FIG. 5). If the media application determines that no results match query 104 (e.g., "Wizard of eyes"), the media application may cause icon 105 to be generated for display on user equipment 107 to indicate to user 102 that query 104 returned no results. For example, if the media application provides access to media assets, the media application may determine there are no results matching the query if no media assets contain metadata (e.g., title, cast, genre, descriptive terms, etc.). Alternatively, the media application may provide results to query 104 upon determining that one or more content items match query 104. For example, if the media application is a generic search engine of the web, the media application may return a result of an eyewear store by the name of "Wizard of Eyes" as a search result in response to query 104. To account for the possibility that the user is indeed searching for an eyewear store by the name of "Wizard of eyes," the media application may monitor activity of the user with respect to the returned results. For example, the media application may identify one or more of factors that may be indicative that the user did intend to search for an eyewear store, e.g., whether a request to access one or more of the returned results was received from the user, whether a subsequent search was received from the user within a threshold period of time (e.g., 1 minute), whether an enthusiastic reaction to the returned results is received from the user (e.g., such as in the form of a voice input, "Thanks, Siri!"), whether one of the returned results is copied, forwarded or bookmarked by the user, etc.

The media application may subsequently monitor further actions received from user 102. For example, the media application may determine whether another query 106 is received from user 102, or whether the user selected one or more of the results returned by query 104 (e.g., in the event that the media application determines one or more results match query 104). The media application may receive query 106 (e.g., "Wizard of ours") from user 102, and may determine that query 106 also does not match any entries in a database (e.g., database 505 of FIG. 5) associated with the media application. In some embodiments, queries 104 and 106 may comprise, for example, typographical errors or transcription errors, e.g., due to an accent of the user inputting a voice query, mistakes by a third party speech-to-text service, the voice input being of poor quality or low volume, the presence of background noise, etc.

The media application may continue to monitor actions received from user 102 and receive query 108 (e.g., "Wizard of Oz"). The media application may cause user equipment 107 to generate for display icons 109, 111, 113 indicative of results matching query 108, and further receive selection of an icon, such as icon 109 for the movie "The Wizard of Oz." In response to receiving selection of icon 111, the media application may cause user equipment 107 to generate for display the movie "The Wizard of Oz." In some embodiments, query 108 (e.g., Wizard of Oz"), based on which a successful reply is generated for output, may be referred to as a terminal query, used to make a correction on the prior query. The media application may determine that a query of a query pair is not successful if content is not consumed based on such query and/or based on whether further searches for content are received from the user.

The media application may determine, in a query pair comprising a first query and a second query received after the first query, whether the second query constitutes a reattempt of the first query. In some embodiments, the second query may be considered to be a reattempt of a first query if it is sufficiently similar (e.g., phonetically and/or semantically) to the first query. In some embodiments, the first query and the second query may have minor differences, or may be the same.

The media application may utilize the sequence of received queries 104, 106, 108 to train, and/or as input to, reattempt machine learning model 114 (e.g., which may correspond to reattempt machine learning model 214 of FIG. 2 and reattempt machine learning model 314 of FIG. 3), which is discussed in more detail in connection with FIG. 3. Reattempt machine learning model 114 may be trained to accept as input a pair of queries (e.g., query pair 126 comprising query 104 and query 106) and output a prediction as to whether the one query of the pair constitutes a reattempt of the other query of the pair (e.g., whether the later-received query 106 constitutes a reattempt of earlier-received query 104). For example, for query pair 126 comprising queries 104, 106, reattempt machine learning model 114 may output one or more predictions, e.g., prediction 116 indicating a 91% probability that input query pair 126 constitutes a reattempt and a prediction 118 of a 9% probability that input query pair 126 does not constitute a reattempt. Reattempt machine learning model 114 may accept as input query pair 128 comprising queries 106, 108 and output one or more predictions, e.g., prediction 122 of a 93% probability that query pair 128 is a reattempt, and a prediction 124 of a 7% probability that query pair 128 is not a reattempt.

As discussed above and below, the determination of whether a query pair constitutes a reattempt yields a number of benefits, e.g., the repeated attempt at discovering the same subject matter acts as confirmation to the media application of what the user is intending to search, and enables the media application to identify a stored query pair (e.g., at reattempts database 132) that is similar to or an exact match of such reattempt and that was an acceptable search result for another user (e.g., within a predetermined time from a current time, and/or where such another user is located within a predetermined distance from the user and/or has overlapping interests). Such insight enables the media application to suggest a modified search to the user (or automatically perform a search for the user) based on the identified query pair, with an enhanced likelihood that the current user may be provided with acceptable results based on such search.

Reattempts database 132 (e.g., server 504 and/or database 505 of FIG. 5) may be configured to store respective query pairs along with an associated success indicator. The success indicator may be an indication as to whether a reply generated for output (e.g., a performed search) based on the query pair was acceptable. In some embodiments, the media application may determine the reply based on the query pair was acceptable if content returned based on the search is selected and consumed by the user (e.g., for a continuous or non-continuous period of time greater than a threshold period of time) and/or whether the another query was thereafter received from the user (e.g., without receiving any selection of content returned based on the initial search, or receiving only minimal interaction with the initial results before the next query). Additionally or alternatively, positive feedback received from the user in response to the search results (e.g., in the form of a positive rating of the search results, or receipt of voice input of "Thanks Siri!") may be indicative of the success of the search.

In some embodiments, reattempts database 132 may be a feedback map that is continually updated based on each user within a predefined set to provide the most recent map of query pairs of the user population base. For example, the predefined set may comprise one or more of users within a predetermined distance from each other in a same geographic area, or users of similar demographics (e.g., age group, interests, etc.), and the media application may have received queries from such users within a predetermined period of time from the current time. In some embodiments, the media application may apply an eviction policy to the reattempts database 132, e.g., to reduce false positive cases where the reattempt fails or a second user continues to search for content that is different from what a first user is searching for. The eviction policy may enable the query pairs in reattempts database 132 to be current, by expelling query pairs that may be outdated (e.g., received more than a threshold period of time from a current time).

Reattempts database 132 may store a plurality of database records, e.g., database records 134, 136, 138 associated with respective various query pairs. Each database record may comprise an indication of the query pair, an indication of whether the query pair constituted a reattempt query pair (e.g., based on output of reattempt machine learning model 114), and a success indicator. For example, database record 134 may comprise information indicating the query pair "Wizard of eyes" and "Wizard of ours" constituted a reattempt but was not successful (e.g., the user did not consume content returned based on the "Wizard of ours" query), and database record 136 may comprise information indicating the query pair "Wizard of ours" and "Wizard of Oz" constituted a reattempt and was successful (e.g., the user consumed content returned based on the "Wizard of ours" query). Database 132 may store associations between related query pairs. For example, database record 134 may be determined to be related to database record 136 (e.g., since "Wizard of ours" is present in each of database records 134, 136). In some embodiments, query pairs 126 and 128 may be added to reattempts database 132 after the media application determines such queries were part of a sequence of searches comprising at least one reattempt query and a success indicator indicating at least one query in the query sequence was acceptable. In some embodiments, reattempts database 132 may additionally store certain data tags (e.g., based on NLP) indicative of semantic characteristics of the particular queries making up respective query pairs.

Database record 138 may correspond to a query pair comprising a first query of "Tom Cruise movie" received at a first time and a second query "With Nicole Kidman" received at a second, later time. An output of reattempt machine learning model 114, in response to receiving input of the query pair associated with database record 138, may indicate that such query pair does not constitute a reattempt, e.g., machine learning model 114 may recognize that "With Nicole Kidman," when considered in combination with the earlier query of "Tom Cruise movie," constitutes a search for a narrower subset of Tom Cruise movies (e.g., a follow-up query for slightly different and/or more targeted information than the initial query), rather than a reattempt of a similar scope to the initial query. In some embodiments, a query pair that is determined not to constitute a reattempt may be associated with a success indicator of "Null" or not applicable.

In some embodiments, while the above-mentioned follow-up query may not be considered a reattempt query, the media application may use the follow-up query in providing a reply to a future query. For example, if the media application receives a single query of "Tom Cruise movie with Nicole Kidman", the media application may provide a reply to such single query based on a reply that was generated for output in connection with query pair 138. In some embodiments, query pair 138 may be associated with a success indicator (e.g., based on whether content was consumed by a user in connection with a reply to query pair 138), even if the media application determines that query pair 138 is not a reattempt query pair, and the success indicator may be taken into consideration when determining whether to provide the results of query pair 138 in the subsequent search related to the query pair. In some embodiments, the media application may reference a user's consumption history to personalize replies to follow-up queries (e.g., to promote or prioritize replies that are related to the user's areas of interest or past consumption).

As another example, reattempts database 132 may include database record 140, which comprises a reference to the query pair "Eye pad" and "iPad", along with information indicating that such query pair constitutes a reattempt and an indication that such query pair was successful (e.g., one or more users consumed content or otherwise performed actions indicating that the search based on "iPad" was acceptable).

The media application may receive query 141 from user 103. For example, query 141 (e.g., "Wizard of eyes") received from user 103 may be the same or similar to query 104 received from user 102, and query 141 may be received at a later time than query 104. The media application may determine that there are no results matching query 141 (or that none of the results was selected by user 103, or the results were browsed and/or viewed by user 103 for only a short period of time, such as less than a threshold period of time, e.g., one minute), and cause icon 105 to be generated for display to indicate this to the user. The media application may then determine that query 143 has been received (e.g., immediately after query 141, or within a predetermined period of time of query 141) from user 103. Query 143 may be similar to or the same as query 106 received from user 102. The media application may determine that there are no results matching query 143 (or that none of the results was selected by user 103, or were browsed and/or viewed by user 103 for only a short period of time, such as less than a threshold period of time, e.g., one minute).

The media application may, after receiving the sequence of queries 141 and 143, determine whether query 143 constitutes a reattempt of query 141. The media application may determine whether the query pair constitutes a reattempt by, for example, inputting the query pair comprising queries 141 and 143 into reattempt machine learning model 114. In some embodiments, the media application may determine whether the query pair constitutes a reattempt by comparing the query pair to known queries (e.g., stored at database 132) labeled as either a reattempt or not a reattempt, and determine there is a match if a similarity score as between the query pair and the query pairs stored at the database exceeds a predetermined threshold.

If the media application determines the query pair comprising queries 141 and 143 constitutes a reattempt, the media application may access a plurality of sets of query pairs at reattempts database 132. The media application may compare the query pair comprising queries 141 and 143 to database records of query pairs in database 132 and determine a closest match (e.g., by comparing terms and phrases of query strings and determining similarity scores as between the query pair and the query pairs stored in database 132). The media application may identify a query pair (e.g., corresponding to database record 134) of the plurality of query pairs stored in database 132 that matches the query pair comprising queries 141 and 143. The media application may determine that while identified query pair 134 is associated with an indicator that a reply generated for output based on query pair 134 was unsuccessful, reattempts database 132 indicates a relationship between database records 134 and 136, where database record 136 is associated with a success indicator. Thus, the media application may suggest to the user to modify or mutate 142 query 143 to "Wizard of Oz" associated with database record 136 (or automatically modify and perform a search based on "Wizard of Oz" without further user input). Accordingly, the media application may leverage past reattempt query pairs that were acceptable to improve the user experience (e.g., to expedite the user's search process and minimize the amount of reattempt searches the user performs before discovering desirable content). In some embodiments, modifying a query may comprise replacing certain terms in the initial query and/or adding certain terms to the initial query and/or removing certain terms from the initial query based on the identified query pair. Such modification of one or more terms may comprise replacing the entire query or a subset of the query. In some embodiments, a query from the identified query pair may be substituted for the latest query in the received sequence.

In some embodiments, reattempts database 132 may store query pairs for a predetermined period of time (e.g., for one day, or for a specific time of day) before deleting the query pairs from database 132, which may enable tailoring suggestions or modifications to a query to return trending or popular content potentially of interest to the user, while additionally conserving storage resources for database records more likely to be useful to the media application. In some embodiments, the media application may initially or exclusively search query pairs database records in database 132 based that have been added to database 132 for a predetermined period of time, and/or that have been added to database 132 by users of a same demographic (e.g., age, interests, profession, education, connections on social media, etc.) and/or of a same geographic location (e.g., users within a predetermined distance from the user, or the same country, county, city or state as the user). Such features enable leveraging the assumption that, within a specific region or within certain demographics, two or more users may be searching for the same content during same time period.

In some embodiments, the media application may associate query pairs with a user profile of the user that input the query, and the media application may personalize a reply to subsequent queries based on the user's activity in response to past queries. For example, if the media application determines that a particular user prefers one type of content (e.g., sports) to another type of content (e.g., news programs) based on the user's consumption history, the media application may prioritize replies related to sports in a list of replies provided to the user (e.g., to accentuate or make more prominent to the user sports-related replies to the query or query pair). The media application may determine that other users, in connection with a prior query or query pair that is similar to or the same as a current query or query pair, consumed certain content (e.g., related to football), and that such other users have similar preferences or consumption habits to the current user associated with the current query or query pair. In such instance, the media application may generate for output one or more replies to the current query or query pair received from the current user based on the content consumed by such other similar users (e.g., replies related to football).

In some embodiments, reattempts database 132 may store various statistics or metrics in connection with each respective database record. For example, if the media application has received 1,000 sequences of query pairs identical or similar to queries 126 and 128 from users within the past 24 hours from a current time, database 132 may keep track of each sequence of query pairs that led to an acceptable result, e.g., the media application may determine that the sequence of query pairs 126 and 128 has led to an acceptable result in 85% of such query sequences in the past 24 hours, which exceeds a particular threshold (e.g., 50%) and thus the media application may assign a success indicator to such sequence of query pairs.

In some embodiments, the media application may access a stored query pair to resolve a single ambiguous query. For example, if the media application were to receive a single query of query 143 for "Wizard of ours" from user 103, the media application may determine that query 143 matches query 106 (of query pair 128 previously received from user 102), and immediately recommend query 108 (associated with success indicator 130) without first receiving an additional query from user 103. In some embodiments, the media application may identify, based on the single query, a successful query to recommended to the user, based on a transitive relationship (as discussed in more detail in connection with FIG. 2B) between the single query and a sequence of past queries related to the single query.

In some embodiments, the media application may determine not to perform a search in response to determining that a received query pair matches a stored query pair, and instead retrieve a previously generated reply (e.g., a cached reply to the same or similar query pair). For example, if the media application receives query 141 and query 143 (determined to be a reattempt of query 141) in succession, the media application may determine that a cached reply exists (e.g., if the movie "Wizard of Oz" is trending) and retrieve the cached reply without performing at least one of the searches associated with queries 141 and 143. In some embodiments, the cached reply may relate to a live broadcast of a program or event (e.g., that many users in a particular geographic area or demographic are currently attempting to access).

Figure 2A:
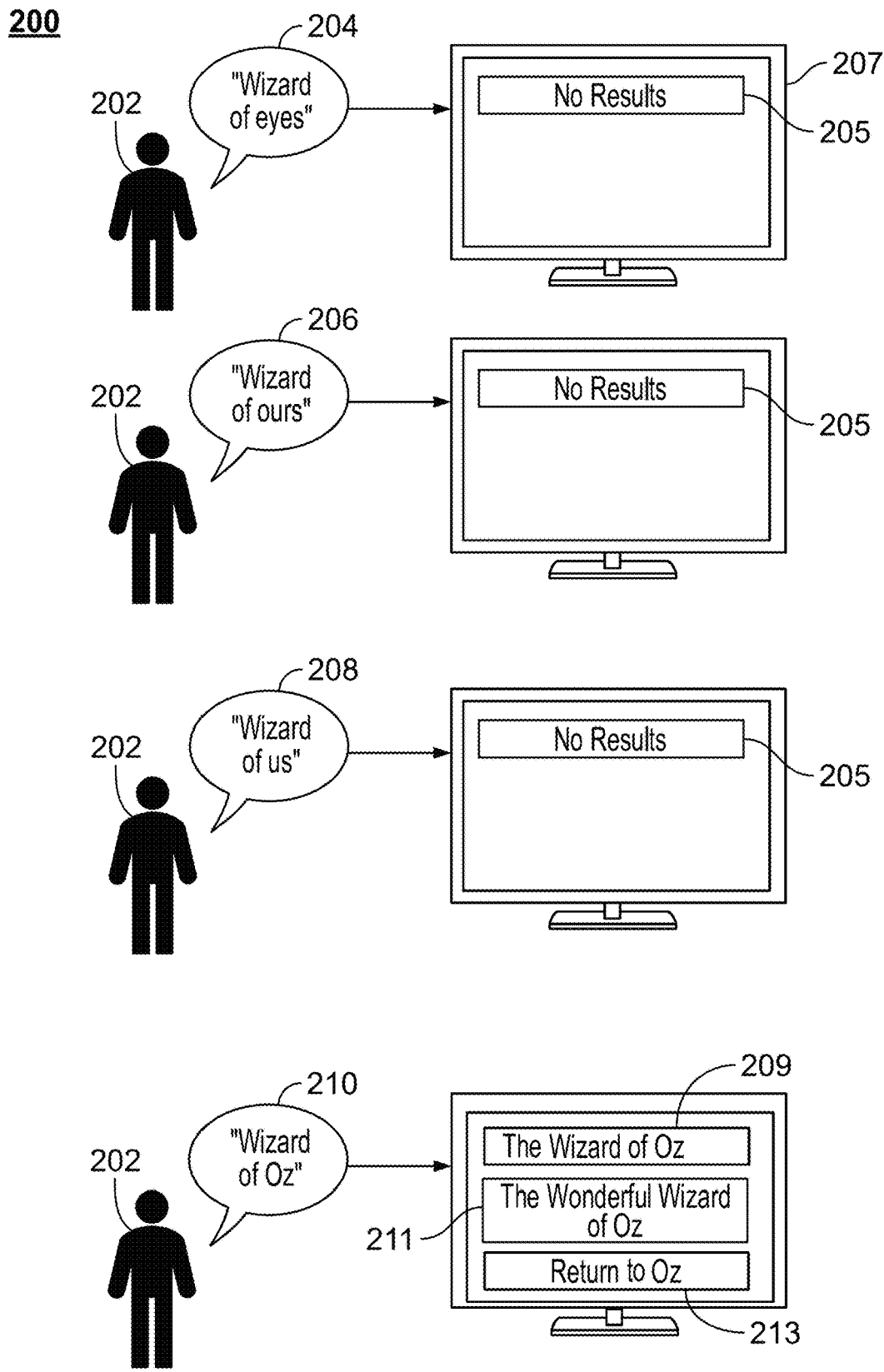
FIG. 2A shows a block diagram for determining whether query pairs constitute a reattempt and generating database records based on query pairs, in accordance with some embodiments of this disclosure.
Figure 2A:
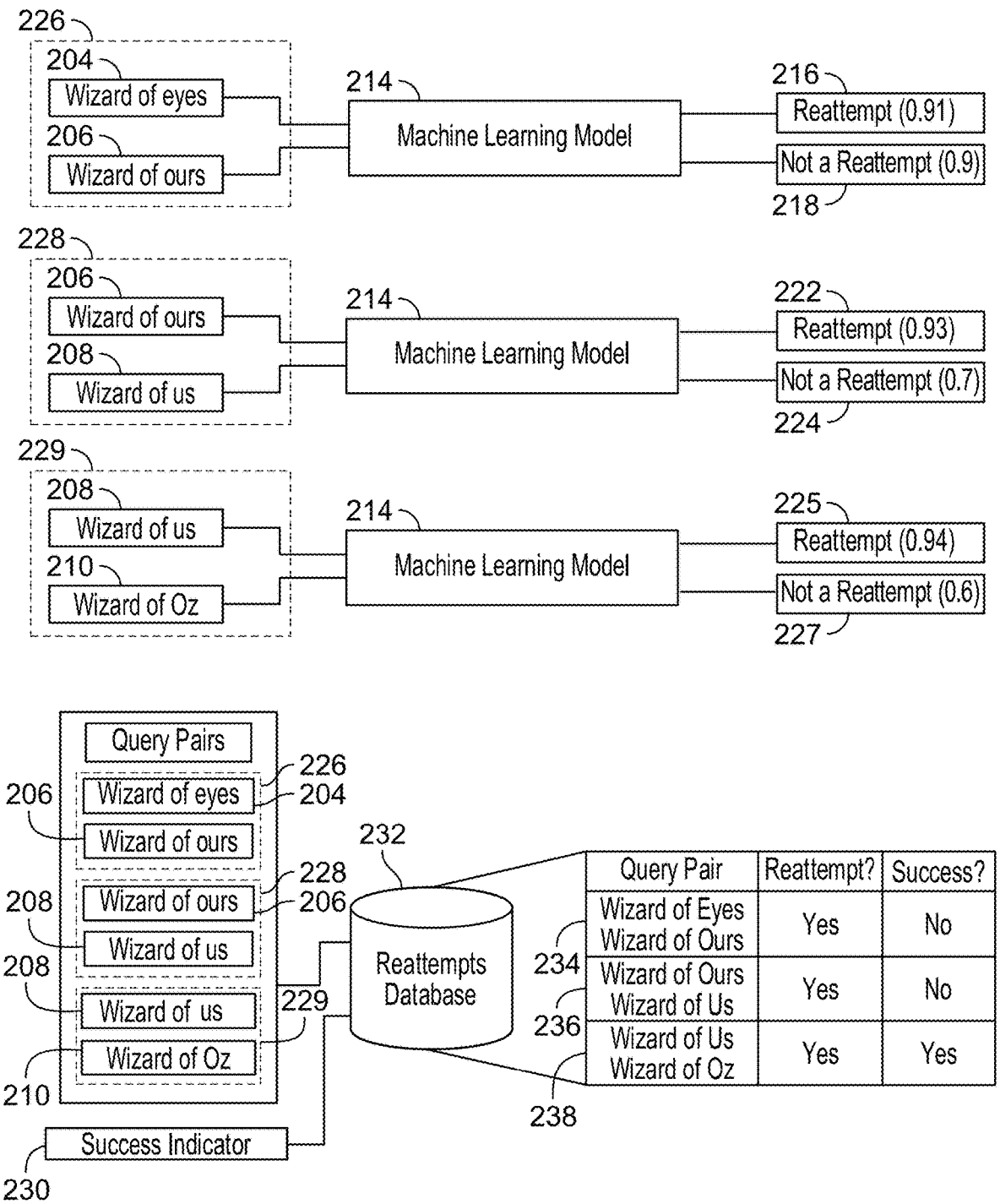

FIG. 2A shows a block diagram 200 for determining whether query pairs constitute a reattempt and generating database records based on query pairs, in accordance with some embodiments of this disclosure. The media application receives query 204 (e.g., "Wizard of eyes") from user 202 in any suitable format (e.g., text-based input, audio or voice input, touch input, biometric input, or any combination thereof) via a suitable interface (e.g., input interface 410, microphone 418 of FIG. 4, etc.). The media application may return no results in response to such query, and cause user equipment 207 to generate for output an indication of such at icon 205. Alternatively, the media application may return one or more results based on query 204.

The media application may then receive query 206 (e.g., "Wizard of ours") from user 202, followed by subsequent query 208 (e.g., "Wizard of us"), each of which may return no results, or return results that elicit minimal interaction from the user. Query 210 (e.g., "Wizard of Oz") may then be received from the user, which may return a plurality of results, e.g., identifiers 209, 211, 213 for media assets "The Wizard of Oz," "The Wonderful Wizard of Oz," "Return to Oz," respectively). The media application may determine that such reply generated for output based on query 210, as part of sequence of queries 204, 206, 208, 210, was acceptable (e.g., if the user consumes content based on the returned search for at least a predetermined period of time, or selects more than a predetermined number of content items returned based on the search).

The media application may utilize the sequence of received queries 204, 206, 208, 210 to train, and/or as input to, reattempt machine learning model 214 (e.g., which may correspond to reattempt machine learning model 114 of FIG. 1 and reattempt machine learning model 314 of FIG. 3), which is discussed in more detail in connection with FIG. 3. Reattempt machine learning model 214 may be trained to accept as input a pair of queries (e.g., query pair 226 comprising queries 204, 206; query pair 228 comprising queries 206, 208; query pair 229 comprising queries 208, 210) and output a prediction as to whether the one query of the pair constitutes a reattempt of the other query of the pair (e.g., whether the later-received query 206 constitutes a reattempt of earlier-received query 204).

For example, for query pair 226 comprising queries 204, 206, reattempt machine learning model 214 may output one or more predictions, e.g., prediction 216 indicating a 91% probability that input query pair 226 constitutes a reattempt and prediction 218 indicating a 9% probability that input query pair 226 does not constitute a reattempt. Reattempt machine learning model 214 may accept as input query pair 228 comprising queries 206, 208 and output one or more predictions, e.g., prediction 222 of a 93% probability query pair 228 is a reattempt, and a prediction 224 of a 7% probability query pair 228 is not a reattempt. Reattempt machine learning model 214 may accept as input query pair 229 comprising queries 208, 210 and output one or more predictions, e.g., prediction 225 of a 94% probability query pair 229 is a reattempt, and a prediction 227 of a 6% probability query pair 229 is not a reattempt.

Query pairs 226, 228, 229 may be input into reattempts database 232, along with respective success indicators, as part of respective database records 234, 236, 238. For example, database record 234 may comprise a reference to query pair 226, an indication that such query constituted a reattempt and an indication that a reply generated for output based on was not acceptable. Reattempts database 232 may further comprise database record 236 comprising a reference to query pair 228, an indication that such query constituted a reattempt and an indication that a reply generated for output based on the query pair was not acceptable, and reattempts database 232 may further comprise database record 238 comprising a reference to query pair 229, an indication that such query constituted a reattempt and an indication that a reply generated for output was acceptable.

Figure 2B:
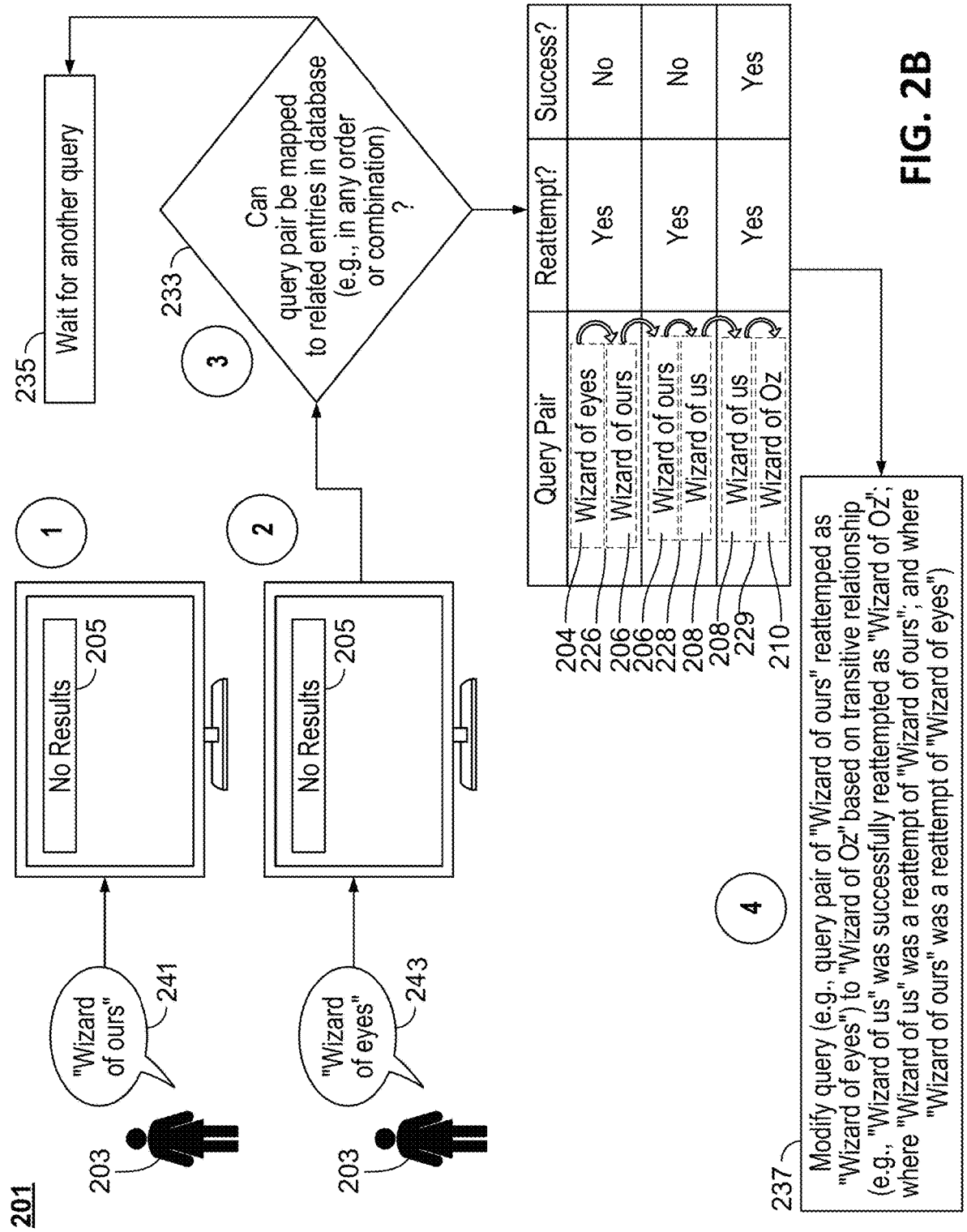
FIG. 2B shows a block diagram for performing a search based on an identified query pair in a set of reattempt query pairs, in accordance with some embodiments of this disclosure.

FIG. 2B shows a block diagram 201 for performing a search based on an identified query pair in a set of reattempt query pairs, in accordance with some embodiments of this disclosure. The media application may receive query 241 from user 203. For example, query 241 (e.g., "Wizard of ours") received from user 203 may be the same or similar to query 206 received from user 202, and query 241 may be received at a later time than query 206. The media application may determine that there are no results matching query 241 (or that none of the results were selected by user 203, or were only browsed and/or viewed by user 203 for a short period of time, such as less than a threshold period of time, e.g., 1 minute), and cause icon 205 to be generated for display to indicate this to the user. The media application may then determine that query 243 has been received (e.g., immediately after query 241, or within a predetermined period of time of query 241) from user 103. Query 243 may be similar to or the same as query 204 received from user 202. The media application may determine that there are no results matching query 241 (or that none of the results were selected by user 203, or were only browsed and/or viewed by user 203 for a short period of time, such as less than a threshold period of time, e.g., one minute).

The media application may, after receiving sequence of queries 141 and 143, determine whether query 243 constitutes a reattempt of 241. The media application may determine whether the query pair constitutes a reattempt by, for example, inputting the query pair comprising queries 241 and 243 into reattempt machine learning model 214. In some embodiments, the media application may determine whether the query pair constitutes a reattempt by comparing the query pair to known queries (e.g., stored at reattempts database 232) labeled as either a reattempt or not a reattempt, and determine there is a match if a similarity score as between the query pair and the query pairs stored at the database exceeds a predetermined threshold.

At 233, the media application may query reattempts database 232, which may store query pairs 226, 228, 229 (e.g., based on the sequence of queries received from user 204). Based on such query, the media application may determine that the pair of queries 241, 243 received from user 203 matches query pair 226, albeit in a reverse order, and that query pair 226 did not yield an acceptable search result. However, the media application may nonetheless determine, based on relationships between query pairs 226, 228, 229 specified in database 232, that the pair of queries 241, 243 received from user 203 in fact matches query pair 229 stored in database 232, where query pair 229 is associated with a success indicator (e.g., based on a value of success indicator 130). For example, the media application may determine that the pair of queries 241, 243 received from user 203 matches query pair 229 based on the transitive relationship specified in the database and/or determined by the media application. For example, in query pair 229, "Wizard of us" was successfully reattempted as "Wizard of Oz"; in query pair 228, "Wizard of us" was a reattempt of "Wizard of ours"; and in query pair 226, "Wizard of ours" was a reattempt of "Wizard of eyes," and since the pair of queries 241, 243 received from user 203 matches query pair 226, the pair of queries 241, 243 received from user 203 is also matches query pair 229).

Based on this insight, the media application may generate for display a suggestion to modify query 243 (e.g., "Wizard of eyes") to query 210 (e.g., "Wizard of Oz"), or automatically perform a search based on the modified query. Thus, the media application may leverage past sequences of queries (e.g., received from other similarly situated users, and/or within a predetermined period of time from the present query pair) to expedite a user's search and avoid the time and frustration of entering multiple reattempts. That is, the media application may enable user 203 to perform appropriate searches to reach desirable results earlier in the sequence (e.g., after entering just a pair of queries, as opposed to two or more pairs of queries received from user 202) and avoid a repeated traversal of a route that has already been taken to arrive at a target.

In some embodiments, one or more machine learning models may aid in a process of modifying or updating a query within a query pair that is determined to be a reattempt. For example, such one or more machine learning models may perform filter relaxation, which may be understood as preemptively relaxing a query (e.g., removing a term from the query) upon determining one or more terms of the query are extraneous, e.g., if there is little to no connection between the extraneous terms and the other terms of the query and such extraneous terms may be determined as having little or no impact on obtaining desirable search results. For example, the media application may determine that a past query that was a part of a reattempt and that was acceptable is similar to the current query, but omits certain terms, the omission of which may improve the search results obtained based on the query. For example, if one of the queries in a query pair corresponds to "Tom Cruise in Mission Impossible," the media application may perform filter relaxation to remove "Tom Cruise in" from the query (e.g., if based on recent searches by similarly situated users, the connection between "Tom Cruise" and "Mission Impossible" is not contributing to improving search results in the context of this particular query pair).

Figure 3:
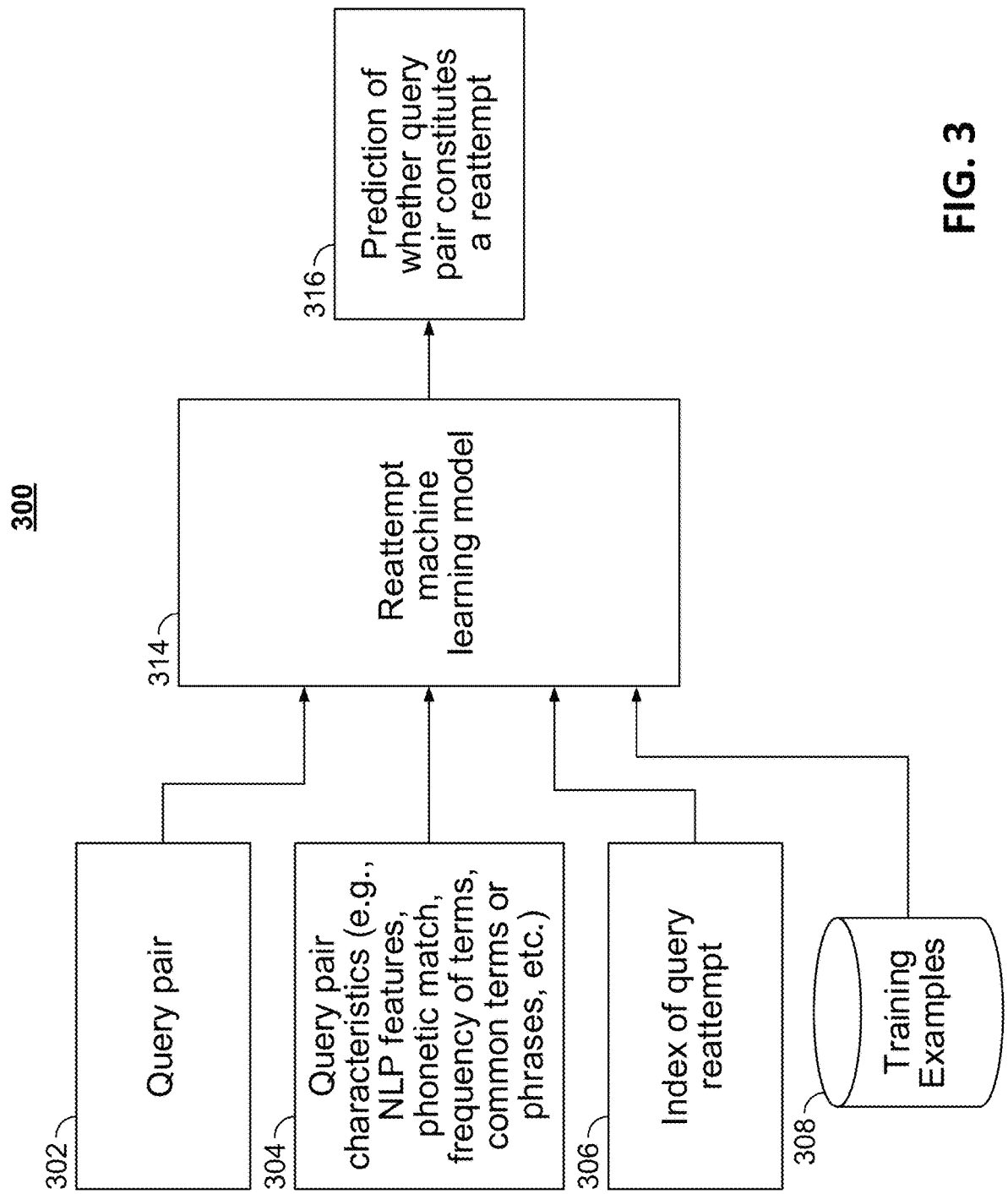
FIG. 3 shows a block diagram for an exemplary machine learning model to predict whether a query pair constitutes a reattempt, in accordance with some embodiments of this disclosure.

FIG. 3 shows a block diagram 300 for an exemplary machine learning model 314 to predict whether a query pair constitutes a reattempt, in accordance with some embodiments of this disclosure. In some embodiments, machine learning model 314 may be one or more of a neural network, classification model, clustering model (e.g., a support vector machine, K-nearest neighbors, K-means clustering, where K representing the input may be equal to two) to classify an input query pair as either a reattempt or not a reattempt. In some embodiments, machine learning model 314 may be trained by way of unsupervised learning, e.g., to recognize and learn patterns based on unlabeled data. Additionally or alternatively, machine learning model 314 may be supervised and trained with labeled training examples 308 (e.g., stored at database 505 of FIG. 5) of known and labeled reattempts to help the model converge to an acceptable error range. The training examples may include a query pair 302, query pair characteristics 304, and an index of query reattempt 306 (with or without labels). Based on such training, the trained machine learning model may identify certain features or patterns of a query and/or context of the query that are predictive of whether a query pair constitutes a reattempt, and the trained machine learning model may apply such learned inferences and patterns to received query pairs. The media application may pre-process the query pair 302 and one or more other inputs to generate one or more vectors indicative of key features of query pair and one or more other inputs, and such vectors may be input into trained machine learning model 314.

Various automatic speech recognition techniques may be employed by the media application, e.g., to determine query pair characteristics 304 for input into model 314. For example, the media application may perform natural language processing (NLP) on the terms included in query pair 302, such as rule-based NLP techniques or algorithms may be employed to parse text included in query 104. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, conjunction, participle, article); perform named entity recognition; and identify phrases, sentences, proper nouns, or other linguistic features of the text string.

The machine learning model may additionally or alternatively receive as input a dictionary of terms or phrases having similar or matching semantic features, and/or a dictionary of terms or phrases having similar or matching phonetic features (e.g., for a query comprising "Pirates of the Caribbean," "Caribbean" may be associated with varying phonetic pronunciations). Such query pair characteristics 304 may alternatively or additionally include frequency in document input, e.g., term frequency-inverse document frequency (tf-idf), and/or terms or phrases common to each of the queries in the query pair). Index of query reattempt 306 may be an indicator of whether a prior query pair within a same sequence of query pair 302 constituted a reattempt. Based on such inputs, reattempt machine learning model 314 may be configured to output prediction 316 of whether input query pair 302 constitutes a reattempt, and the media application may create a database record for a reattempts database (e.g., 132 of FIG. 1) comprising input query pair 302 and the associated determination of whether such query pair constitutes a reattempt. The inputs to model 314 may comprise word-level features (e.g., term by term parsing and analysis) as well as query level features (e.g., the context of the query).

In some embodiments, the media application may employ a word- (or phrase- or sentence-) embedding machine learning model in determining a meaning of a query of a query pair, determining whether a query pair constitutes a reattempt, and/or determining whether a query pair in a database (e.g., database 132 of FIG. 1) is similar to the received query pair. For example, a text corpus may be used to train a word-embedding machine learning model, in order to represent each word as a vector in a vector space. In some embodiments, a Word2Vec machine learning model may be employed as the word-embedding machine learning model. The Word2Vec model may contain plural models, one of which may be an unsupervised deep learning machine learning model used to generate vector representations (e.g., word embeddings) of words in a corpus of text used to train the model. The generated vectors may be indicative of contextual and semantic similarity between the words in the corpus. In training the Word2Vec model, a neural network may be employed with a single hidden layer, where the weights of the hidden layer correspond to the word vectors being learned. Word2Vec may utilize the architectures of a Continuous Bag of Words model or a Continuous Skip-gram model to generate the word embeddings, as discussed in Mikolov et al., Efficient Estimation of Word Representations in Vector Space, ICLR Workshop, 2013, which is hereby incorporated by reference herein in its entirety. A cosine similarity operation as between respective angles may be used to determine the similarity between words.

In some embodiments, the media application performs operations on word embeddings included in the phrase or sentence (e.g., to compute an average or weighted average of word vectors in the sentence), and performs a cosine similarity operation between the computed vectors to determine sentence similarity. In some embodiments, one or more machine learning models may be used by the system to obtain sentence or phrase embeddings of queries, such as discussed in Le et al., "Distributed Representations of Sentences and Documents," In Proceedings of the 31st International Conference on Machine Learning, PMLR 32(2):1188-1196, 2014, which is hereby incorporated by reference herein in its entirety. In some embodiments, a machine learning model may return respective confidence scores based on the identified word embeddings, e.g., confidence scores as to whether a query pair constitutes a reattempt, a meaning of a particular query pair, whether a query pair matches a query sequence stored in the database.

FIGS. 4-5 describe exemplary devices, systems, servers, and related hardware for determining whether query pairs constitute a reattempt and generating database records based on query pairs and performing a search based on an identified query pair in a set of reattempt query pairs, in accordance with some embodiments of the present disclosure. FIG. 4 shows generalized embodiments of illustrative user equipment devices 400 and 401. For example, user equipment device 400 may be a smartphone device. In another example, user equipment system 401 may be a user television equipment system (e.g., user equipment 107 of FIG. 1). User television equipment system 401 may include set-top box 416. Set-top box 416 may be communicatively connected to microphone 418, speaker 414, and display 412. In some embodiments, microphone 418 may receive voice commands for the media application. In some embodiments, display 412 may be a television display or a computer display. In some embodiments, set-top box 416 may be communicatively connected to user input interface 410. In some embodiments, user input interface 410 may be a remote control device. Set-top box 416 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 4. Each one of user equipment device 400 and user equipment system 401 may receive content and data via input/output (I/O) path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402, which may comprise I/O circuitry. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media application stored in memory (i.e., storage 408). Specifically, control circuitry 604 may be instructed by the media application to perform the functions discussed above and below. In some implementations, any action performed by control circuitry 604 may be based on instructions received from the media application.

In client/server-based embodiments, control circuitry 404 may include communications circuitry suitable for communicating with a media application server or other networks or servers. The instructions for carrying out the above mentioned functionality may be stored on a server (which is described in more detail in connection with FIG. 4. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media application data described above. Nonvolatile memory may also be used (e.g., to launch a boot-up routine and other instructions). Cloud-based storage, described in relation to FIG. 4, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of user equipment 400. Circuitry 604 may also include digital-to-analog converter circuitry and analog-to-digital converter circuitry for converting between digital and analog signals. The tuning and encoding circuitry may be used by user equipment device 400, 401 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment device 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of each one of user equipment device 400 and user equipment system 401. For example, display 412 may be a touchscreen or touch-sensitive display. In such circumstances, user input interface 410 may be integrated with or combined with display 412. Display 412 may be one or more of a monitor, a television, a display for a mobile device, or any other type of display. A video card or graphics card may generate the output to display 412. The video card may be any processing circuitry described above in relation to control circuitry 404. The video card may be integrated with the control circuitry 404. Speakers 414 may be provided as integrated with other elements of each one of user equipment device 400 and user equipment system 401 or may be stand-alone units. The audio component of videos and other content displayed on display 412 may be played through the speakers 414. In some embodiments, the audio may be distributed to a receiver (not shown), which processes and outputs the audio via speakers 414.

The media application may be implemented using any suitable architecture. For example, it may be a stand-alone application wholly-implemented on each one of user equipment device 400 and user equipment system 401. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 608 and process the instructions to rearrange the segments as discussed. Based on the processed instructions, control circuitry 404 may determine what action to perform when input is received from user input interface 410. For example, movement of a cursor on a display up/down may be indicated by the processed instructions when user input interface 410 indicates that an up/down button was selected.

In some embodiments, the media application is a client/server-based application. Data for use by a thick or thin client implemented on each one of user equipment device 400 and user equipment system 401 is retrieved on-demand by issuing requests to a server remote to each one of user equipment device 400 and user equipment system 401. In one example of a client/server-based guidance application, control circuitry 404 runs a web browser that interprets web pages provided by a remote server. For example, the remote server may store the instructions for the application in a storage device. The remote server may process the stored instructions using circuitry (e.g., control circuitry 404) to perform the operations discussed in connection with FIGS. 1-3 and 6-7.

In some embodiments, the media application may be downloaded and interpreted or otherwise run by an interpreter or virtual machine (run by control circuitry 404). In some embodiments, the media application may be encoded in the ETV Binary Interchange Format (EBIF), received by the control circuitry 404 as part of a suitable feed, and interpreted by a user agent running on control circuitry 404. For example, the media application may be an EBIF application. In some embodiments, the media application may be defined by a series of JAVA-based files that are received and run by a local virtual machine or other suitable middleware executed by control circuitry 404. In some of such embodiments (e.g., those employing MPEG-2 or other digital media encoding schemes), the media application may be, for example, encoded and transmitted in an MPEG-2 object carousel with the MPEG audio and video packets of a program.

FIG. 5 is a diagram of an illustrative streaming system, in accordance with some embodiments of this disclosure. User equipment devices 508, 509, 510 (e.g., user equipment device 106) may be coupled to communication network 506. Communication network 506 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 506.

System 500 includes a media content source 502 and a server 504, which may comprise or be associated with database 505. Communications with media content source 502 and server 504 may be exchanged over one or more communications paths but are shown as a single path in FIG. 5 to avoid overcomplicating the drawing. In addition, there may be more than one of each of media content source 502 and server 504, but only one of each is shown in FIG. 5 to avoid overcomplicating the drawing. If desired, media content source 502 and server 504 may be integrated as one source device.

In some embodiments, server 504 may include control circuitry 511 and a storage 514 (e.g., RAM, ROM, Hard Disk, Removable Disk, etc.). Storage 514 may store a reattempts database (e.g., reattempts database 132 of FIG. 1, reattempts database 232 of FIG. 2). Server 504 may also include an input/output path 512. I/O path 512 may provide device information, or other data, over a local area network (LAN) or wide area network (WAN), and/or other content and data to the control circuitry 511, which includes processing circuitry, and storage 514. The control circuitry 511 may be used to send and receive commands, requests, and other suitable data using I/O path 512, which may comprise I/O circuitry. I/O path 512 may connect control circuitry 504 (and specifically processing circuitry) to one or more communications paths.

Control circuitry 511 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 511 executes instructions for an emulation system application stored in memory (e.g., the storage 514). Memory may be an electronic storage device provided as storage 514 that is part of control circuitry 511.

Server 504 may retrieve guidance data from media content source 502, process the data as will be described in detail below, and forward the data to user equipment devices 508, 509, 510. Media content source 502 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). Media content source 502 may include cable sources, satellite providers, on-demand providers, Internet providers, over-the-top content providers, or other providers of content. Media content source 502 may also include a remote media server used to store different types of content (including video content selected by a user), in a location remote from any of the client devices. Media content source 502 may also provide metadata that can be used to in identifying results matching a query of a received query pair as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network such as the Internet via communication network 506. In such embodiments, user equipment devices may operate in a peer-to-peer manner without communicating with a central server.

Figure 6:
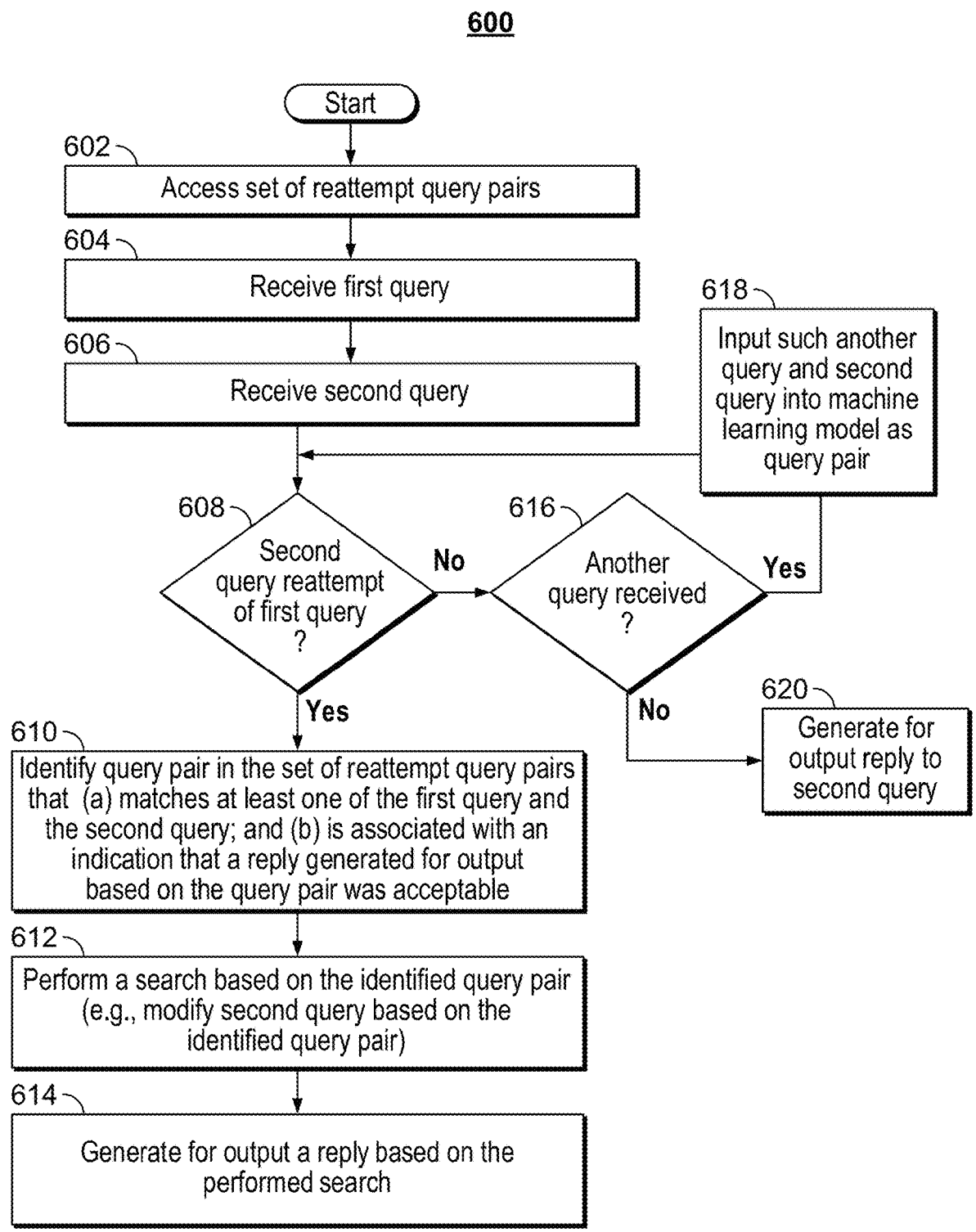
FIG. 6 is a flowchart of a detailed illustrative process for performing a search based on an identified query pair in a set of reattempt query pairs, in accordance with some embodiments of this disclosure.

FIG. 6 is a flowchart of a detailed illustrative process 600 for performing a search based on an identified query pair in a set of reattempt query pairs, in accordance with some embodiments of this disclosure. In various embodiments, the individual steps of process 600 may be implemented by one or more components of the devices and systems of FIGS. 1-5. Although the present disclosure may describe certain steps of process 600 (and of other processes described herein) as being implemented by certain components of the devices and systems of FIGS. 1-5, this is for purposes of illustration only, and it should be understood that other components of the devices and systems of FIGS. 1-5 may implement those steps instead. For example, the steps of process 600 may be executed by server 504 and/or by user equipment device 508, 509, and/or 510 to perform a search based on an identified query pair in a set of reattempt query pairs.

At 602, input/output circuitry (e.g., I/O path 402) of a client device (e.g., user equipment device 107 of FIG. 1) may access a set of query pairs (e.g., associated with database records 134, 136, 138, 140 of FIG. 1) at a database (e.g., reattempts database 132 of FIG. 1). Each respective query pair may include an initial query and a reattempt of the initial query (and/or be associated with an indication that the later-received query is not a reattempt of the initial query), and may be associated with an indication of whether a reply generated for output based on the respective query pair was acceptable (e.g., whether the user consumed content based on the query). The database may store a database record for each query pair, and may indicate an association between query pairs (e.g., that query pairs 126 and 128, corresponding to database records 134 and 136, are part of a sequence of queries received in succession within a current user session and/or within a predetermined period of time).

At 604, input/output circuitry (e.g., I/O path 402) of a client device (e.g., user equipment device 107 of FIG. 1) may receive a first query (e.g., query 141 of FIG. 1). The received query may be received via any suitable input (e.g., voice input, touch input, text entry, navigating a user interface, etc.).

At 606, input/output circuitry (e.g., I/O path 402) of a client device (e.g., user equipment device 107 of FIG. 1) may receive a second query (e.g., query 143 of FIG. 1). The received query may be received via any suitable input (e.g., voice input, touch input, text entry, navigating a user interface, etc.).

At 608, control circuitry (e.g., control circuitry 404 of device 400 of FIG. 4 and/or control circuitry 511 of server 504 of FIG. 5) may determine whether the second query (e.g., query 143 of FIG. 1) is a reattempt of the first query (e.g., query 141 of FIG. 1). The control circuitry may employ a machine learning model (e.g., reattempt machine learning model 314) in making such determination. In some embodiments, the control circuitry may perform filter relaxation on a query (e.g., if the control circuitry determines that the second query contains extraneous terms that do not contribute to returning desirable results based on the query).

At 610, in response to determining that the second query constitutes a reattempt of the first query, the control circuitry may identify a query pair (e.g., query pair 126 of FIG. 1) in the set of reattempt query pairs (e.g., stored at database 132 of FIG. 1) that matches at least one of the first query and the second query (e.g., the query pair of query 141 and 143) and that is associated with an indication that a reply generated for output based on the query pair was acceptable (e.g., that a past user consumed content based on such query pair). In some embodiments, the media application may analyze a transitive relationship as between database records when identifying the query pair (e.g., as discussed in the example of FIG. 2B).

On the other hand, if at 608 the control circuitry determines the second query does not constitute a reattempt of the first query, processing may proceed to 616, where the control circuitry waits for another query. Upon receiving another query at 618, processing returns to 608 where the control circuitry determines whether the query pair (e.g., including the newly received query, as well as the second query of the prior query pair that was analyzed) constitutes a reattempt. If such another query is not received, the control circuitry may at 620 cause a user equipment device to generate for output a response to the second query (e.g., query 143 of FIG. 1).

At 612, the control circuitry (e.g., control circuitry 404 of device 400 of FIG. 4 and/or control circuitry 511 of server 504 of FIG. 5) may perform a search based on the identified query pair. For example, the control circuitry may modify the second query (e.g., query 143) to instead comprise the text of query 108 of query pair 128, where a prior search based on query 108 (e.g., "Wizard of Oz") led to an acceptable result.

At 614, the control circuitry (e.g., control circuitry 404 of device 400 of FIG. 4 and/or control circuitry 511 of server 504 of FIG. 5) may cause the user equipment device (e.g., user equipment device 107 of FIG. 1) to generate for output (e.g., via text or voice by way of display 412 and/or speaker 414 of FIG. 4) a reply to the query (e.g., the modified query now corresponding to query 108) based on the performed search. For example, the search results comprising the identifiers 109, 111, 113 may be generated for output by the control circuitry at the user equipment.

Figure 7:
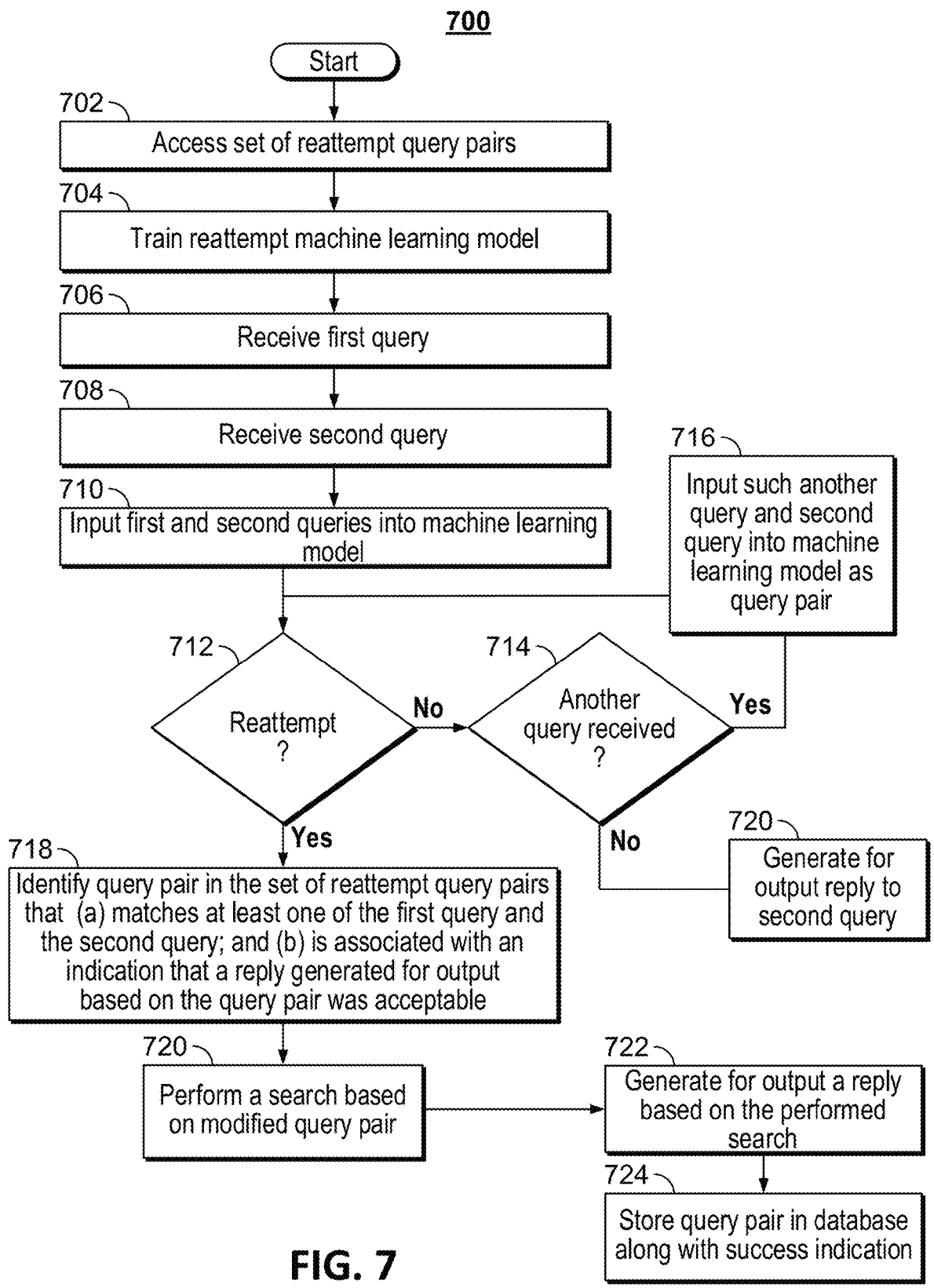
FIG. 7 is a flowchart of a detailed illustrative process for performing a search based on an identified query pair in a set of reattempt query pairs, in accordance with some embodiments of this disclosure.

FIG. 7 is a flowchart of a detailed illustrative process 700 for performing a search based on an identified query pair in a set of reattempt query pairs, in accordance with some embodiments of this disclosure. In various embodiments, the individual steps of process 700 may be implemented by one or more components of the devices and systems of FIGS. 1-5. Although the present disclosure may describe certain steps of process 700 (and of other processes described herein) as being implemented by certain components of the devices and systems of FIGS. 1-5, this is for purposes of illustration only, and it should be understood that other components of the devices and systems of FIGS. 1-5 may implement those steps instead. For example, the steps of process 700 may be executed by server 504 and/or by user equipment device 508, 509, and/or 510 to perform a search based on an identified query pair in a set of reattempt query pairs.

At 702, input/output circuitry (e.g., I/O path 402) of a client device (e.g., user equipment device 107 of FIG. 1) may access a set of query pairs (e.g., associated with database records 134, 136, 138, 140 of FIG. 1) at a database (e.g., reattempts database 132 of FIG. 1). Processing may be performed in a similar manner as at 602.

At 704, control circuitry (e.g., control circuitry 404 of device 400 of FIG. 4 and/or control circuitry 511 of server 504 of FIG. 5) may train a reattempt machine learning model (e.g., reattempt machine learning model 114, 214, 314 of FIGS. 1-3, respectively) to accept as input a query pair and query pair characteristics and output a prediction as to whether such query pair is indicative of a reattempt. The machine learning model may comprise one or more of a neural network, clustering model and classification model, as discussed in connection with FIG. 3.

Processing at 706 and 708 may be performed in a similar manner as at 604 and 606 of FIG. 6.

At 710, the control circuitry may input the first query and the second query (e.g., query 243 and query 241 of FIG. 2) into the reattempt machine learning model (e.g., model 314 of FIG. 3), along with one or more of query pair characteristics (e.g., NLP features, phonetic match features, frequency of terms features, common terms or phrases features, etc.).

At 712, the control circuitry may obtain as output from the machine learning model a prediction as to whether the query pair constitutes a reattempt. If the prediction indicates the query pair is a reattempt, processing may proceed to 71,8 which may be performed in a similar manner as at 610 of FIG. 6. If the prediction indicates the query is not a reattempt, processing may proceed to 714 which may be performed in a similar manner as at 616-620 of FIG. 6).

Processing at 720 and 722 may be performed in a similar manner as 612 and 614 of FIG. 6. At 724, the control circuitry may cause the query pair (e.g., including the modified query pair) to be stored as a new reattempt query pair in a database (e.g., database 232 of FIG. 2) or use the indication of another successful search to update an already-existing database record for the query pair (e.g., update database record 229 to indicate that modification of a query associated with "Wizard of Oz" has led to another acceptable outcome in this instance).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   accessing a set of reattempt query pairs, wherein each respective pair in the set:
      comprises an initial query and a reattempt of the initial query; and
      is associated with an indication of whether a reply generated for output based on the respective query pair was acceptable;
   training a reattempt machine learning model to accept as input a first query and a second query and one or more characteristics of the first query and the second query and output a probability that the second query is indicative of a reattempt of the first query;
   determining that a fourth query that was received after a third query constitutes a reattempt of the third query by:
      inputting the third query and the fourth query, and one or more characteristics of the third query and the fourth query, to the trained reattempt machine learning model; and
      receiving, from the trained machine learning model based on the input to the trained machine learning model, an output of a probability indicating that the fourth query constitutes a reattempt of the third query;
   in response to determining that the fourth query constitutes a reattempt of the third query:
      identifying a query pair in the set of reattempt query pairs that: (a) matches at least one of the third query and the fourth query; and (b) is associated with an indication that a reply generated for output based on the query pair was acceptable;

performing a search based on the identified query pair in the set of reattempt query pairs; and generating for output a reply based on the performed search.

2. The method of claim 1, wherein performing the search comprises:

modifying the fourth query based on at least one query of the identified query pair; and performing the search using the modified query.

3. The method of claim 1, wherein identifying the query pair in the set of reattempt query pairs comprises:

comparing the third query and the fourth query to each query of the query pair; and determining at least one of the third query and the fourth query is an exact match of a query of the query pair.

4. The method of claim 1, wherein:

the set of reattempt query pairs comprises a first query pair that is associated with a second query pair and a third query pair; and identifying the query pair in the set of reattempt query pairs comprises:

determining the third query matches a query from one of the first query pair or the second query pair;

determining the fourth query matches a query from the other of the first query pair or the second query pair;

determining the third query pair comprises a query from one of the first query pair or the second query pair and is associated with an indication that a reply generated for output based on the third query pair was acceptable; and modifying the fourth query based on the third query pair.

5. The method of claim 1, wherein:

the reply generated based on the generated for output based on the query pair comprises a selectable identifier for a content item;

the method further comprises:

in response to receiving user selection of the identifier, causing the content item to be generated for consumption by a user; and the indication that the reply generated for output based on the query pair was acceptable is generated based on determining the content item was consumed by the user.

6. The method of claim 1, wherein determining whether the fourth query constitutes a reattempt of the third query further comprises determining that content was not consumed based on the third query prior to receiving the fourth query.

7. The method of claim 6, wherein the set of reattempt query pairs is received from a plurality of users within a predetermined period of time from a current time, and the plurality of users belong to at least one of a particular demographic or a particular geographic area.

8. The method of claim 7, wherein the set of reattempt query pairs is discarded after the predetermined period of time elapses.

9. The method of claim 1, wherein the one or more characteristics comprise at least one of phonetic word match information between the first and second queries, frequencies of terms within the first and second queries, common terms or phrases as between the first and second queries, parts of speech of terms in the first and second queries, or whether a previous pair of queries within a query sequence including the first and second queries constituted a reattempted query.

10. The method of claim 1, wherein:

the set of reattempt query pairs comprises a first query pair that is associated with a second query pair and a third query pair; and identifying the query pair is based on identifying a relationship between the third query, the fourth query, and queries from each of first query pair, the second query pair and the third query pair, by:

determining that the third query matches a query from the first query pair and a query from the second query pair;

determining that the fourth query matches a query from the second query pair;

determining that neither of the third query nor the fourth query match the queries of the third query pair;

determining that a query from the second query pair matches a query from the third query pair; and determining that the third query pair is associated with an indication that a reply generated for output based on the third query pair was acceptable.

11. The method of claim 10, wherein:

the first query pair includes a first initial query and a first reattempt query;

the second query pair includes a second initial query and a second reattempt query; and the third query pair includes a third initial query and a second reattempt query; and identifying the relationship further comprises:

determining that the third query matches the first reattempt query and the second initial query, and that the third query does not match the first initial query, the second reattempt query, the third initial query or the third reattempt query;

determining that the fourth query matches the first initial query and that the fourth query does not match the first reattempt query, the second initial query, the third initial query or the third reattempt query; and determining that the second reattempt query of the second query pair matches the third initial query of the third query pair; and based on the identified relationships, performing the search based on the identified query pair comprises performing the search using the third reattempt query of the third query pair.

12. A system comprising:

a storage device; and control circuitry configured to:

access a set of reattempt query pairs at the storage device, wherein each respective pair in the set:

comprises an initial query and a reattempt of the initial query; and is associated with an indication of whether a reply generated for output based on the respective query pair was acceptable;

train a reattempt machine learning model to accept as input a first query and a second query and one or more characteristics of the first query and the second query and output a probability that the second query is indicative of a reattempt of the first query;

determine that a fourth query that was received after a third query constitutes a reattempt of the third query by:

inputting the third query and the fourth query, and one or more characteristics of the third query and the fourth query, to the trained reattempt machine learning model; and receiving, from the trained machine learning model based on the input to the trained machine learning model, an output of a probability indicating that the fourth query constitutes a reattempt of the third query;

in response to determining that the fourth query constitutes a reattempt of the third query:

identify a query pair in the set of reattempt query pairs that: (a) matches at least one of the third query and the fourth query; and (b) is associated with an indication that a reply generated for output based on the query pair was acceptable;

perform a search based on the identified query pair in the set of reattempt query pairs; and generate for output a reply based on the performed search.

13. The system of claim 12, wherein the control circuitry is configured to perform the search by:

modifying the fourth query based on at least one query of the identified query pair; and performing the search using the modified query.

14. The system of claim 12, wherein the control circuitry is configured to identify the query pair in the set of reattempt query pairs by:

comparing the third query and the fourth query to each query of the query pair; and determining at least one of the third query and the fourth query is an exact match of a query of the query pair.

15. The system of claim 12, wherein:

the set of reattempt query pairs comprises a first query pair that is associated with a second query pair and a third query pair; and the control circuitry is configured to identify the query pair in the set of reattempt query pairs by:

determining the third query matches a query from one of the first query pair or the second query pair;

determining the fourth query matches a query from the other of the first query pair or the second query pair;

determining the third query pair comprises a query from one of the first query pair or the second query pair and is associated with an indication that a reply generated for output based on the third query pair was acceptable; and modifying the fourth query based on the third query pair.

16. The system of claim 12, wherein the reply generated based on the generated for output based on the query pair comprises a selectable identifier for a content item, and the control circuitry is further configured to:

in response to receiving user selection of the identifier, cause the content item to be generated for consumption by a user; and generate the indication that the reply generated for output based on the query pair was acceptable based on determining the content item was consumed by the user.

17. The system of claim 12, wherein the control circuitry is further configured to determine whether the fourth query constitutes a reattempt of the third query by determining that content was not consumed based on the third query prior to receiving the fourth query.

18. The system of claim 17, wherein the control circuitry is configured to receive the set of reattempt query pairs from a plurality of users within a predetermined period of time from a current time, and the plurality of users belong to at least one of a particular demographic or a particular geographic area.

19. The system of claim 18, wherein the control circuitry is further configured to discard the set of reattempt query pairs after the predetermined period of time elapses.

20. The system of claim 12, wherein the one or more characteristics comprise at least one of phonetic word match information between the first and second queries of the query pair, frequencies of terms within the first and second queries, common terms or phrases as between the first and second queries, parts of speech of terms in the first and second queries, or whether a previous pair of queries within a query sequence including the first and second queries constituted a reattempted query.

\* \* \* \* \*